(12) United States Patent
Chapman et al.

(10) Patent No.: US 9,389,843 B2
(45) Date of Patent: Jul. 12, 2016

(54) EFFICIENT INTERPRETER PROFILING TO OBTAIN ACCURATE CALL-PATH INFORMATION

(71) Applicant: International Business Machines Corporation, Armonk, NY (US)

(72) Inventors: Graham Alan Chapman, Nepean (CA); James Ian Andrew Gartley, Markham (CA); Daniel Jonathan Heidinga, Ottawa (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/844,165

(22) Filed: Mar. 15, 2013

(65) Prior Publication Data

US 2013/0247018 A1      Sep. 19, 2013

Related U.S. Application Data

(63) Continuation of application No. 13/420,616, filed on Mar. 15, 2012.

(51) Int. Cl.
*G06F 11/30* (2006.01)
*G06F 9/45* (2006.01)
*G06F 11/34* (2006.01)
*G06F 9/455* (2006.01)

(52) U.S. Cl.
CPC .............. *G06F 8/443* (2013.01); *G06F 9/4552* (2013.01); *G06F 11/3466* (2013.01); *G06F 2201/86* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 6,738,965 B1 * | 5/2004 | Webster | 717/128 |
| 6,910,206 B1 * | 6/2005 | Nevill | 717/153 |
| 7,107,585 B2 | 9/2006 | Berent et al. | |
| 7,293,259 B1 * | 11/2007 | Dmitriev | 717/130 |
| 7,386,686 B2 | 6/2008 | Wu et al. | |
| 7,765,527 B2 | 7/2010 | Burka et al. | |
| 7,823,129 B2 | 10/2010 | Dimpsey et al. | |
| 2003/0046449 A1 * | 3/2003 | Gray-Donald et al. | 709/330 |
| 2004/0194077 A1 | 9/2004 | Bharadwaj et al. | |
| 2008/0288926 A1 | 11/2008 | Cain, III et al. | |
| 2009/0007075 A1 | 1/2009 | Edmark et al. | |

OTHER PUBLICATIONS

Spivey, J. M., "Fast, Accurate Call Graph Profiling," Software: Practice & Experience, vol. 34, Issue 3, pp. 249-264, Mar. 2004.
Malony, Allen D., et al., "Overhead Compensation in Performance Profiling," Proceedings of the 10th International Euro-Par Conference on Parallel Processing, 2004.
Dmitriev, Mikhail, "Profiling Java Applications Using Code Hotswapping and Dynamic Call Graph Revelation," Proceedings of the 4th International Workshop on Software and Performance, 2004.

* cited by examiner

*Primary Examiner* — Lewis A Bullock, Jr.
*Assistant Examiner* — Melissa Alfred
(74) *Attorney, Agent, or Firm* — Nelson and Nelson; Daniel P. Nelson; Alexis V. Nelson

(57) ABSTRACT

A method for obtaining accurate call path information in a mixed-mode environment where interpreted methods and non-interpreted methods can call one another is disclosed. In one embodiment, such a method includes generating an event and recording it in a buffer when an interpreted method calls an interpreted method. The method also generates an event and records it in the buffer when an interpreted method calls a non-interpreted method. The method further generates an event and records it in the buffer when a non-interpreted method calls an interpreted method. The method refrains from generating an event when a non-interpreted method calls a non-interpreted method. A corresponding apparatus and computer program product are also disclosed.

8 Claims, 7 Drawing Sheets

510

| Transition | Call | Return | Throw |
|---|---|---|---|
| Interpreted Method ⟶ Interpreted Method | Yes | Yes | Yes |
| Interpreted Method ⟶ Non-Interpreted Method | Yes | No | No |
| Non-Interpreted Method ⟶ Interpreted Method | Yes | Yes | Yes |
| Non-Interpreted Method ⟶ Non-Interpreted Method | No | No | No |

| Transition | Call | Return | Throw |
|---|---|---|---|
| Interpreted Method → Interpreted Method | Yes | Yes | Yes |
| Interpreted Method → Non-Interpreted Method | Yes | No | No |
| Non-Interpreted Method → Interpreted Method | Yes | Yes | Yes |
| Non-Interpreted Method → Non-Interpreted Method | No | No | No |

EFFICIENT INTERPRETER PROFILING TO OBTAIN ACCURATE CALL-PATH INFORMATION

BACKGROUND

1. Field of the Invention

This invention relates to apparatus and methods for profiling and optimizing computer code, and more specifically to apparatus and methods for profiling computer code to obtain accurate call path information.

2. Background of the Invention

The Java Virtual Machine™ (JVM) uses an interpreter to simulate the execution of Java™ bytecode. Because interpreting is extremely slow, most modern JVMs include a just-in-time (JIT) compiler. The just-in-time compiler converts the Java bytecode into native machine instructions. To better optimize the generated native code, it may be advantageous to profile the Java bytecode using a technique known as interpreter profiling. This process involves "hooking" specific bytecodes and instrumenting the bytecodes to add events to a buffer. The contents of the buffer may then be processed. Processing may involve examining events in the buffer and summarizing them to provide useful information to the just-in-time compiler. The just-in-time compiler may use this information to make better optimization decisions. It may be beneficial to profile things such as call targets for virtual calls, branch taken/not-taken frequencies, array sizes, and call path information.

Currently, the most straight-forward way to obtain accurate call path information is to instrument each invoke bytecode, each return bytecode, each exception throw bytecode, and each catch bytecode in the interpreter. The same may be performed for compiled code, as well as calls through native interfaces. Special consideration may be required for events that transfer control between methods at places other than natural entry and exit points, such as on-stack replacement. On-stack replacement transfers control from compiled coded to an interpreter in the middle of method execution. This can lead to asymmetric event reporting unless special care is taken.

Instrumenting as described above may be used to fill buffers with enough information to obtain, if processed correctly, accurate call edges and call edge frequency (a call edge indicates a call-site/called-method pair, while call frequency indicates how often it was called). It is important that call edges are correct, as optimization decisions based on incorrect call edges can have tremendous negative performance impacts in the generated code. Ensuring accurate call edge frequency is less important than ensuring that call edge frequency is "order of magnitude" correct. For example, optimizers generally do not make decisions based on whether an edge was called 100 times versus 101 times.

Although the techniques described above are generally effective, they unfortunately introduce undesirable performance overhead. Specifically, instrumenting all of the events discussed above produces punitive overhead in terms of interpreter performance. Instrumenting events in compiled code negatively impacts the performance of the compiled code. Furthermore, instrumenting all of the events discussed above produces large amounts of buffer data that requires processing. The performance overhead is significant enough that obtaining the information in the manner described above is not widely performed, since the drawbacks typically outweigh the benefits.

In view of the foregoing, what are needed are apparatus and methods to more efficiently profile call path information. Ideally, such apparatus and methods will provide useful information to a just-in-time compiler while not unduly hindering performance.

SUMMARY

The invention has been developed in response to the present state of the art and, in particular, in response to the problems and needs in the art that have not yet been fully solved by currently available apparatus and methods. Accordingly, apparatus and methods have been developed to more efficiently obtain call path information in mixed-mode environments where interpreted methods and non-interpreted methods can call one another. The features and advantages of the invention will become more fully apparent from the following description and appended claims, or may be learned by practice of the invention as set forth hereinafter.

Consistent with the foregoing, a method for obtaining accurate call path information in a mixed-mode environment where interpreted methods and non-interpreted methods can call one another is disclosed herein. In one embodiment, such a method includes generating an event and recording it in a buffer when an interpreted method calls an interpreted method. The method also generates an event and records it in the buffer when an interpreted method calls a non-interpreted method. The method further generates an event and records it in the buffer when a non-interpreted method calls an interpreted method. The method refrains from generating an event when a non-interpreted method calls a non-interpreted method.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
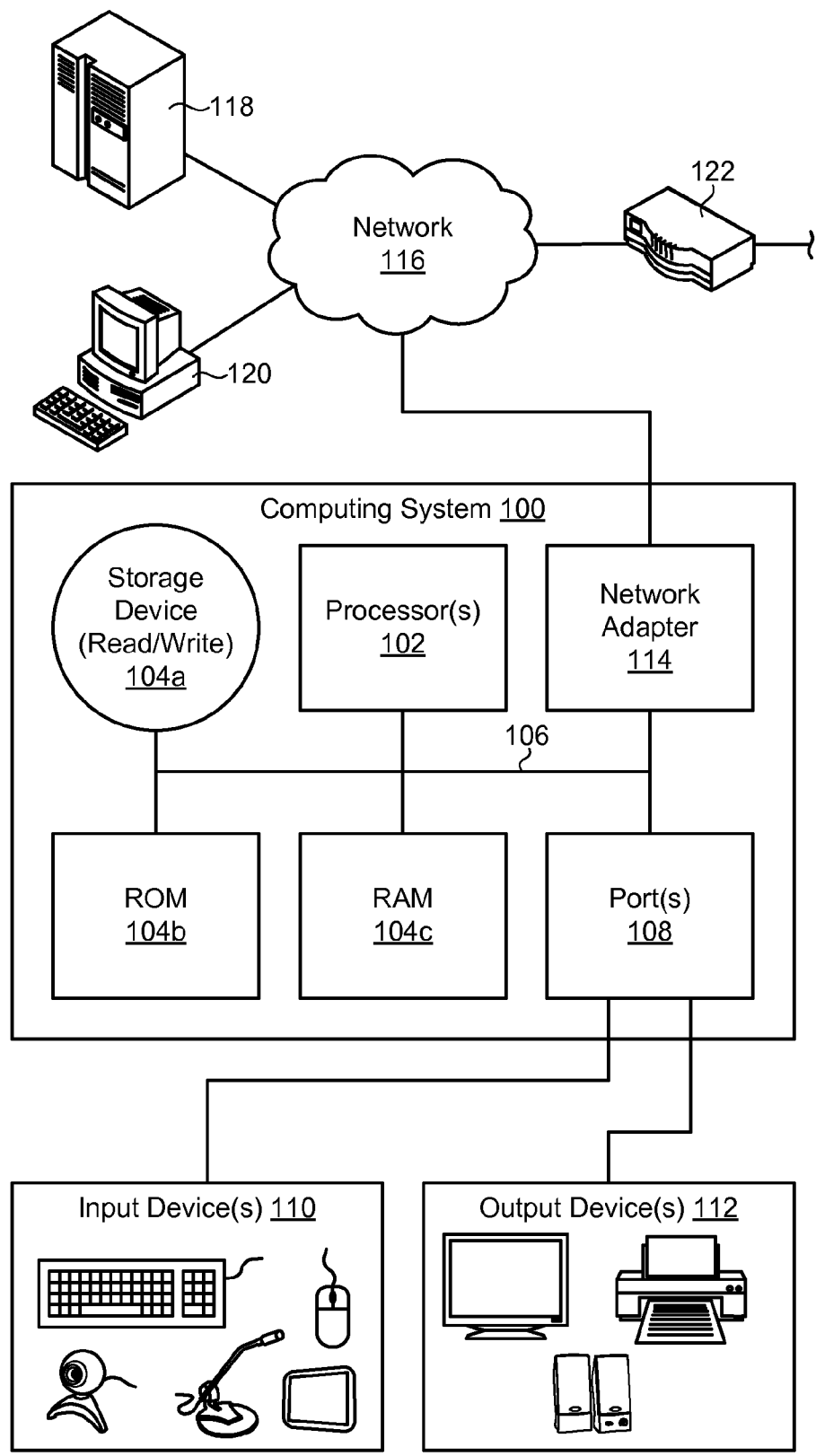
FIG. 1 is a high-level block diagram showing one example of a computing system in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
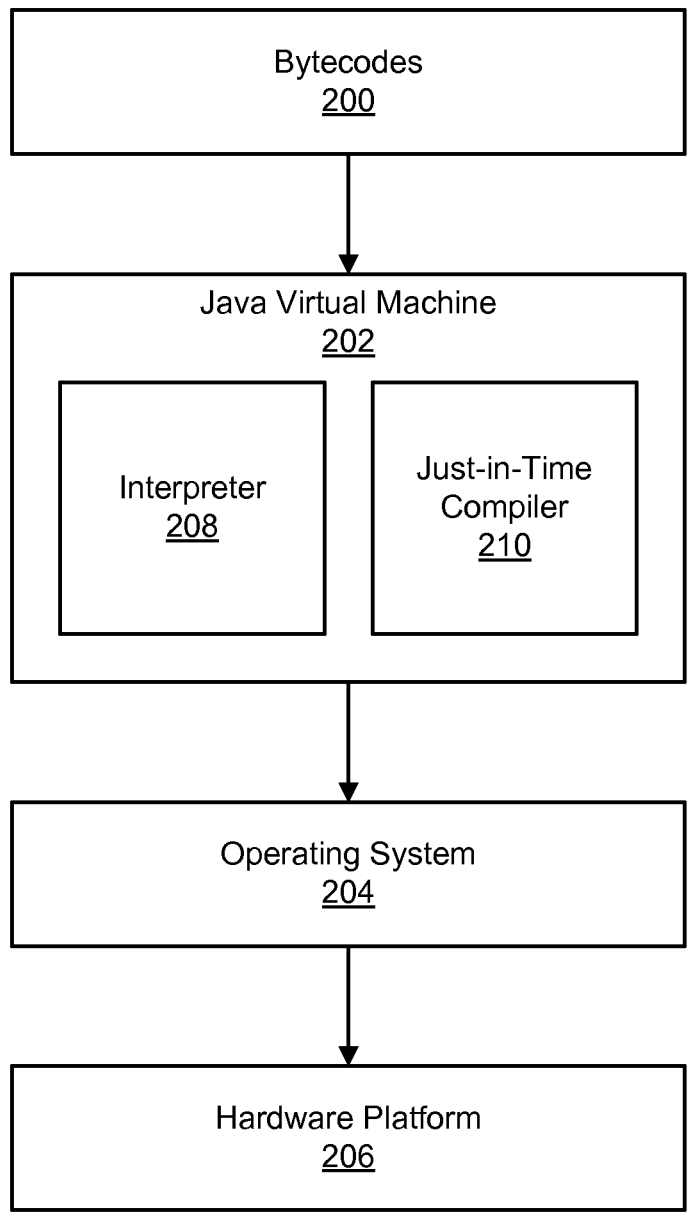
FIG. 2 is a high-level block diagram showing a Java virtual machine (JVM) that includes an interpreter and a just-in-time (JIT) compiler.

Referring to FIG. 2, one example of an object-oriented managed runtime, in this example the Java runtime, is illustrated. The Java runtime environment is presented to show one example of a runtime environment in which various embodiments of the invention may operate. In the Java runtime environment, a Java virtual machine 202 may be configured to operate on a specific platform, which may include an underlying hardware and operating system architecture 204, 206. As shown, the Java virtual machine 202 receives program code 200, compiled to an intermediate form referred to as "bytecode" 200. The Java virtual machine 202 translates this bytecode 200 into native operating system calls and machine instructions for execution on the underlying platform 204, 206. Instead of compiling the bytecode 200 for the specific hardware and software platform 204, 206, the bytecode 200 may be compiled once to operate on all Java virtual machines 202. A Java virtual machine 202, by contrast, may be tailored to the underlying hardware and software platform 204, 206. In this way, the Java bytecode 200 may be considered platform independent.

In certain embodiments, the Java virtual machine 202 includes an interpreter 208 and a just-in-time compiler 210. The interpreter 208 may translate methods (represented in bytecode 200) into native machine instructions each time the bytecodes 200 are executed. The just-in-time compiler 210, on the other hand, may compile methods (represented in bytecode 200) into native machine instructions. The next time the methods are invoked, the native machine instructions may be executed without the need to re-translate the bytecodes. Executing compiled code is generally much faster than interpreting bytecodes. However, just-in-time compilation may also have its drawbacks. Because compilation occurs at the same time as program execution, the time it takes to compile the code is added to the program's running time. Thus, startup times can increase significantly with just-in-time compilation.

In certain embodiments, the Java virtual machine 202 is configured for mixed-mode operation. Some methods, such as less frequently invoked or less computationally intense methods, may be interpreted. Other methods, such as more frequently invoked or more computationally intense methods, may be compiled. During mixed-mode operation, execution may alternate between interpreted methods and compiled methods. Interpreted methods may call compiled methods, thereby transferring control to the compiled methods. Similarly, compiled methods may call interpreted methods, thereby transferring control to the interpreted methods.

Figure 3:
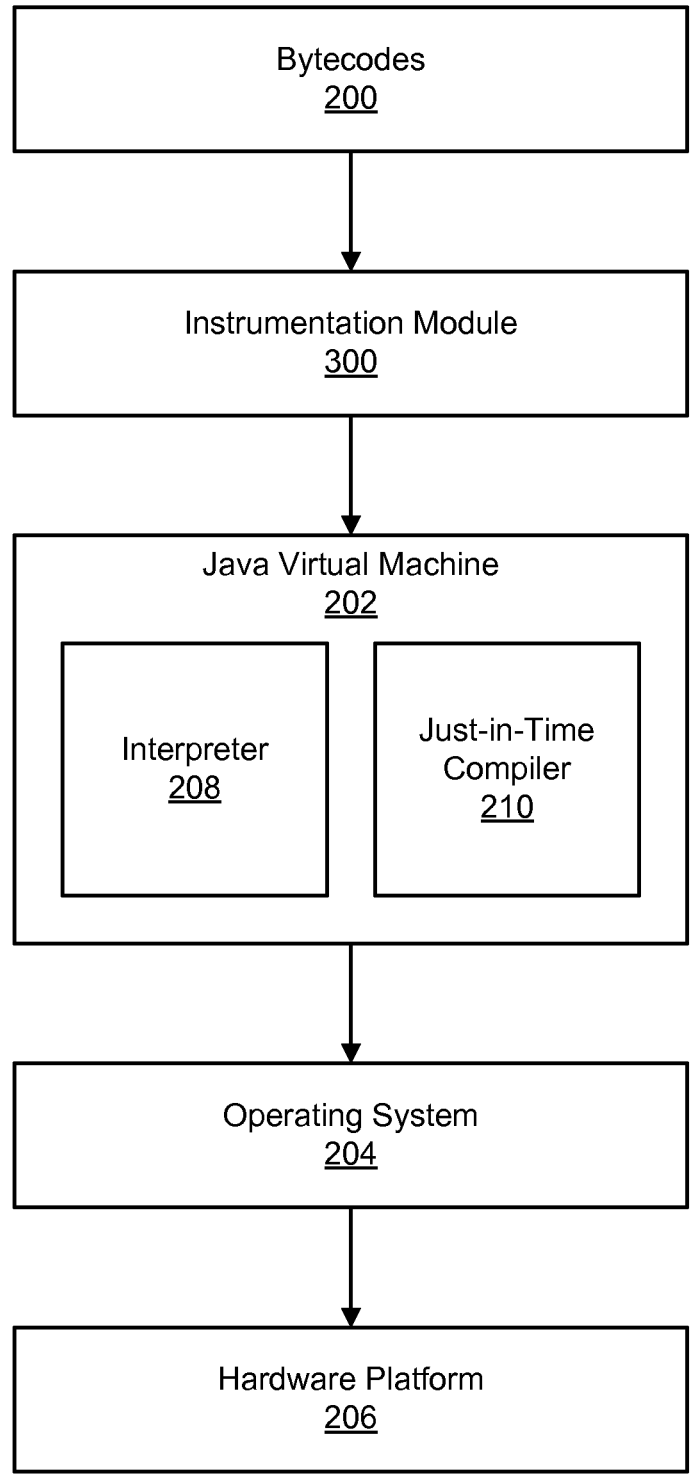
FIG. 3 is a high-level block diagram showing an instrumentation module used to instrument bytecodes provided to the JVM.

Referring to FIG. 3, to better optimize the native code generated by the just-in-time compiler 210, it may be advantageous to profile the bytecodes 200 using a technique known as interpreter profiling. To accomplish this, certain functionality (hereinafter referred to as an instrumentation module 300) may be configured to "hook" specific bytecodes 200 and instrument these bytecodes 200 so that they add events to a buffer 212 when executed. As previously mentioned, it is often beneficial to profile things such as call targets for virtual calls, branch taken/not-taken frequencies, array sizes, and call path information, in order to optimize the compiled code.

The focus of this disclosure is efficiently profiling call path information so that optimizations, such as method inlining and code specialization, can be performed. In order to efficiently profile call path information, the apparatus and methods disclosed herein instrument the bytecodes 200 as well as limited portions of the compiled code to generate a reduced or minimal set of events that, while providing accurate call path information, do not excessively degrade performance. Selecting the events that are generated is a non-trivial matter that will be discussed in more detail in association with FIGS. 5A and 5B. Minimizing or reducing the number of events in the set may minimize or reduce performance degradation in both the interpreted and compiled code, reduce the amount of data that is recorded in buffers, and reduce the amount of data that needs to be processed in order to generate the desired call path information.

Figure 4:
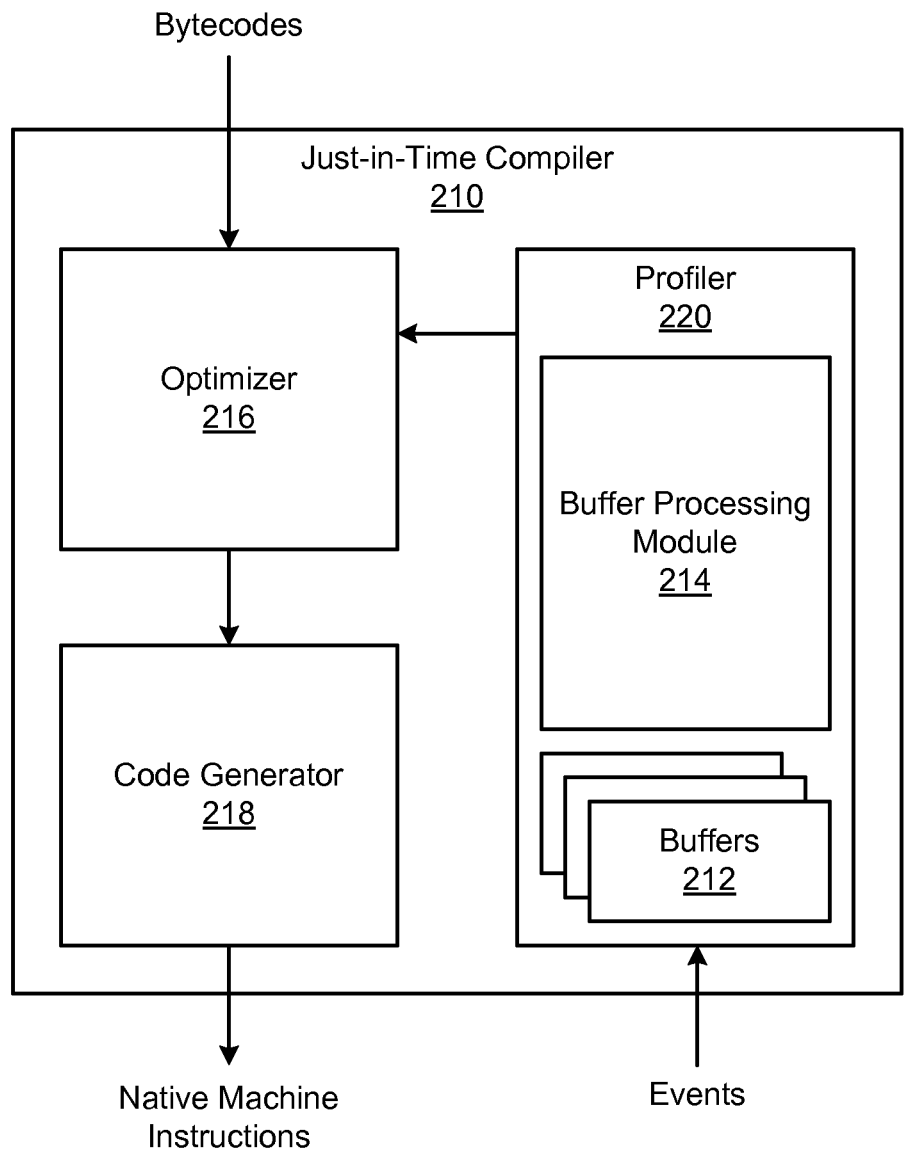
FIG. 4 is a high-level block diagram showing various internal components that may be included in a just-in-time compiler.

Referring to FIG. 4, a high-level block diagram showing one embodiment of a just-in-time compiler 210 is illustrated. The internal components of the just-in-time compiler 210 are presented simply by way of example are not intended to be limiting. Other configurations are possible and within the scope of the invention. As shown, the just-in-time compiler 210 includes an optimizer 216, a code generator 218, and a profiler 220, among other components. As shown, the profiler 220 includes one or more buffers 212 and a buffer processing module 214.

As interpreted and non-interpreted methods (for the purposes of this disclosure "non-interpreted methods" may include compiled methods, native methods, Java native interface (JNI) methods, and the like) are executed, events are added to the buffers 212. At a later time, the buffer processing module 214 analyzes the events to determine the call path information previously described. The call path information may be provided to the optimizer 216 in the form a call graph. As the optimizer 216 receives and analyzes bytecodes 200, the optimizer 216 looks for areas in the bytecodes 200 that can be optimized using the provided call path information. A code generator 218 then compiles the bytecodes 200 into native machine instructions that include the optimizations.

Figures 5A, 5B:
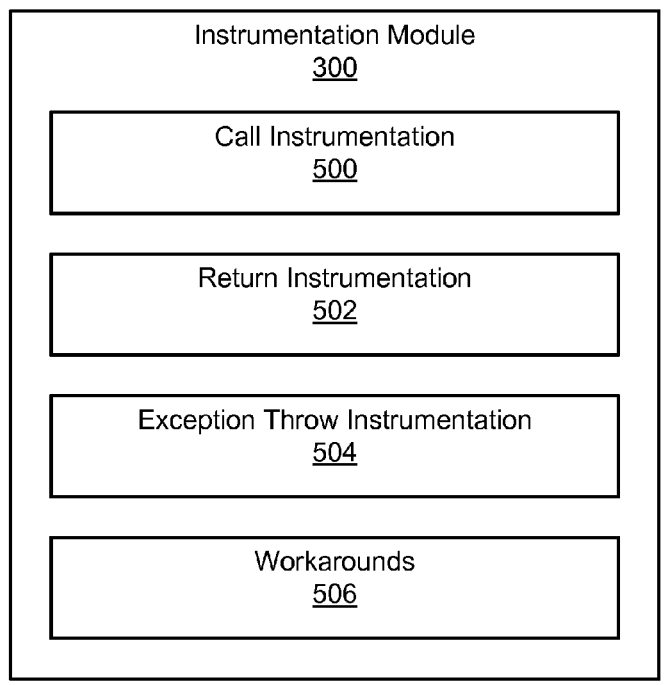
FIG. 5A is a high-level block diagram showing various sub-modules within the instrumentation module.
FIG. 5B is a table showing events that may be generated in a profiling scheme in accordance with the invention.

Referring to FIG. 5, one embodiment of an instrumentation module 300 is illustrated. In certain embodiments, the instrumentation module 300 implements call instrumentation 500 (instrumenting calls from one interpreted or non-interpreted method to another interpreted or non-interpreted method), return instrumentation 502 (instrumenting returns from one interpreted or non-interpreted method to another interpreted or non-interpreted method), and exception throw instrumentation 504 (instrumenting exceptions that are thrown by interpreted or non-interpreted methods and caught by other interpreted or non-interpreted methods). The instrumentation module 300 may also implement various workarounds 506. Workarounds 506 may be needed in cases of asymmetric event reporting, such as cases where an enter event (generated in response to a call) is not accompanied by a corresponding exit event (generated in response to a return). Specific examples of such cases will be explained in more detail in association with FIG. 5B.

Referring to FIG. 5B, in certain embodiments, the instrumentation module 300 is configured to instrument interpreted and non-interpreted methods substantially in accordance with the illustrated table 510. More specifically, the table 510 shows events that may be generated when interpreted or non-interpreted methods transition to other interpreted or non-interpreted methods.

For example, as indicated in the first row of the table 510, an "enter" event is generated when an interpreted method calls an interpreted method, and an "exit" event is generated when an interpreted method returns control to an interpreted method. As further indicated in the first row, when an interpreted method throws an exception, an event is generated when an interpreted method that is popped from the stack in response to the exception.

As indicated in the second row of the table 510, an "enter" event is generated when an interpreted method calls a non-interpreted method, but no event is generated when a non-interpreted method returns control to an interpreted method. As further indicated in the second row, when an interpreted method throws an exception, no event is generated when a non-interpreted method is popped from the stack in response to the exception.

As indicated in the third row of the table 510, an "enter" event is generated when a non-interpreted method calls an interpreted method, and an "exit" event is generated when an interpreted method returns control to a non-interpreted method. As further indicated in the third row, when a non-interpreted method throws an exception, an event is generated when an interpreted method is popped from the stack in response to the exception.

As indicated in the fourth row of the table 510, no event is generated when a non-interpreted method calls a non-interpreted method, nor is an event generated when a non-interpreted method returns control to a non-interpreted method. As further indicated in the fourth row, when a non-interpreted method throws an exception, no event is generated when a non-interpreted method is popped from the stack in response to the exception.

As can be observed from the table 510, no events are generated when executing compiled code. This will ideally preserve the efficiency and speed of the compiled code. All events are generated by interpreted code, or transitions between interpreted code and non-interpreted code. Limiting the set of events in this manner reduces the number of events that need to be processed and eliminates events that are very expensive in terms of performance overhead. However, this reduced set of events is still able to provide accurate call-edge information and order of magnitude correctness in call edge frequency.

In certain embodiments, the following tuple is used to represent an event in the buffer 212: {event type, method identifier}. That is, the tuple may record the type of event (e.g., whether the event is an "enter," "exit," "throw," or "invalidate" event, for example), as well as identify the method that generated the event.

Following the profiling scheme as outlined above may lead to instrumenting the following:
  (1) Interpreter invoke bytecodes (e.g., invokevirtual, invokestatic, invokespecial, and invokeinterface). These will report all invokes from the interpreter when running bytecode. Any invoke not running bytecode will not be reported. This means that the target method of a reflect Method.invoke( ) will not be reported, nor will the target method of a MethodHandle invocation. These types of events may be recorded in the buffer as {enter, method identifier}.
  (2) Interpreter return bytecodes. These will report all returns from bytecoded methods. These types of events may be recorded in the buffer as {exit, method identifier}.
  (3) Calls from compiled code to the interpreter. All calls from compiled code to the interpreter typically run through a common entry point. In certain embodiments, the entry point may be modified to check a flag to determine if it should generate an enter event, but only in the case where the send is an interpreted send. Sends that reach the entry point and then immediately continue in compiled code do not report an event. These types of events may be recorded in the buffer as {enter, method identifier}.
  (4) Native/INL/JNI to interpreter dispatch. JNI calls run through the common entry point "runCallInMethod". In certain embodiments, the entry point may be modified to check a flag to determine if it should generate an enter event. The event may only be generated if a method is invoked in the interpreter. These types of events may be recorded in the buffer as {enter, method identifier}.
  (5) Popping an interpreter frame due to an exception throw. Exception stack walks may be modified to create exit events for interpreter frames that are popped from the stack. Exit events may not be reported for special frames (e.g., JNI, etc) or frames associated with compiled methods. In certain embodiments, exit events are only generated if a flag is set. These types of events may be recorded in the buffer as {throw, method identifier}.

A mentioned above, the instrumentation module 300 may implement various workarounds 506 to address cases of asymmetric event reporting, such as cases where an enter event (generated in response to a call) is not accompanied by a corresponding exit event (generated in response to a return), or vice versa. Cases of asymmetric event reporting and their corresponding workarounds 506 may include the following:
  (1) Dynamic loop transfer (cases where the Java virtual machine 202 initially interprets a method, decides to compile the method prior to completing the method, and then completes the method in its compiled form). Such cases will generate an enter event without a corresponding exit event. In such cases, no workaround 506 is needed since this is no different than invoking a compiled method which generates an enter event without a corresponding exit event.
  (2) Decompilation or on-stack replacement (cases where the Java virtual machine 202 begins executing a compiled method but completes execution of the method in the interpreter). Such cases will generate an exit event without a corresponding enter event. In such cases, a fake enter event may be generated and recorded in the buffer prior to switching to the interpreter. Alternatively, an "invalidate" event, as previously described, may be generated and recorded in the buffer. Such an "invalidate" event may be recorded in the buffer as {invalidate, method identifier}.
  (3) Exceptions thrown from compiled methods or past compiled methods on the stack. In such cases, an exit event may be generated without a corresponding enter event. No workaround is required in such cases. As indicated in the table 510, an exit event is only generated when popping interpreted methods from the stack in response to exceptions thrown by non-interpreted methods.
  (4) Returns from compiled methods in response to calls from interpreted methods. In such cases, an enter event is generated without a corresponding exit event, as indicated in the table 510. No workaround is required in such cases. Although not recorded, the exit may be assumed from the asymmetry that occurs in the buffer, as will be shown in association with FIGS. 6A and 6B.

Figure 6A:
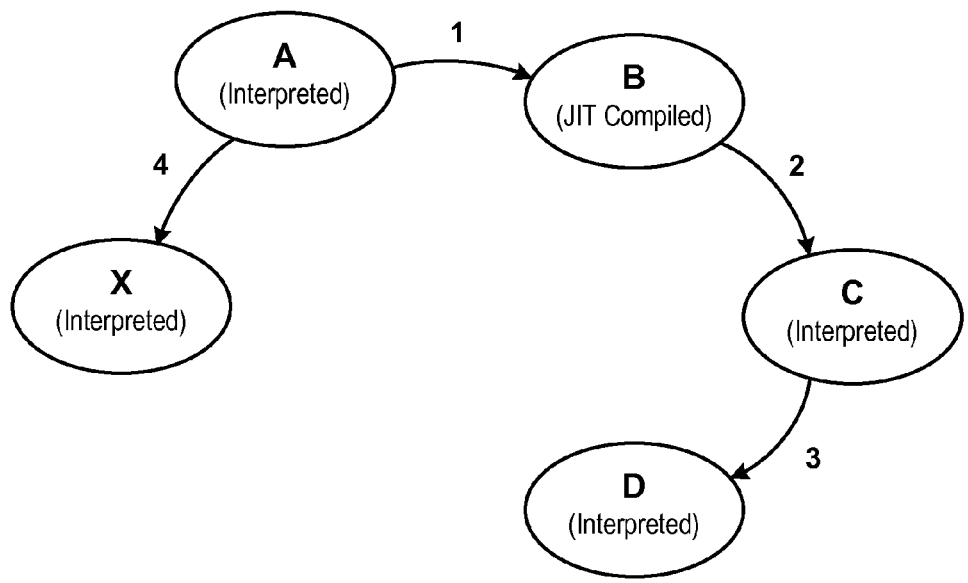
FIG. 6A shows a first exemplary call sequence to illustrate operation of a profiling scheme in accordance with the invention.
Figure 6B:
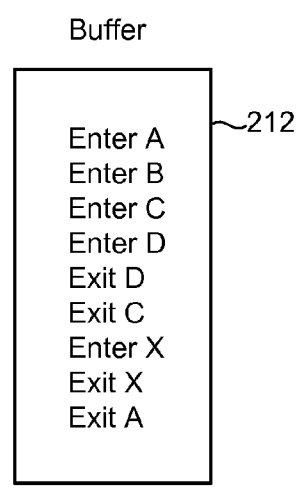
FIG. 6B shows events recorded in a buffer as a result of the exemplary call sequence of FIG. 6A.

FIG. 6A shows a first exemplary call sequence to illustrate operation of the profiling scheme in accordance with the invention. FIG. 6B shows the contents of the buffer 212 in response to the call sequence. As shown in FIG. 6A, in the first call sequence, an interpreted method A calls a compiled method B which calls an interpreted method C which calls an interpreted method D. The interpreted method A then calls an interpreted method X. The buffer 212 in FIG. 6B shows the events that are generated in response to the call sequence.

As shown in FIG. 6B, the missing exit event for method B is a consequence of the fact that method B is a non-interpreted (e.g., compiled) method. The caller-callee pairs cannot be definitively determined until the symmetric exit event for method A is received (i.e., one can determine that method A called method B, and that method C called method D, but one cannot determine if method A called any other method after calling method B, as it is equally possible for method B to have called method A). One can determine that method C called method D by virtue of the exit of method D. However, since one does not know where the exit of method B would occur (i.e., it could occur either before entering method C or after exiting method C), method B's caller cannot be determined. This leads to the following conclusion: caller-callee pairs can only be determined at exit events.

Figure 7A:
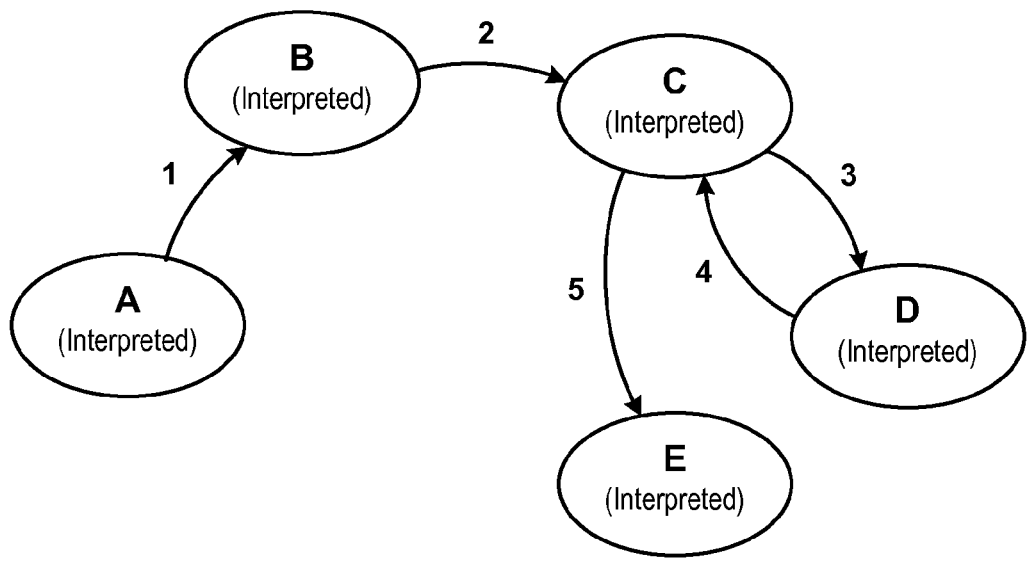
FIG. 7A shows a second exemplary call sequence to illustrate operation of a profiling scheme in accordance with the invention.
Figure 7B:
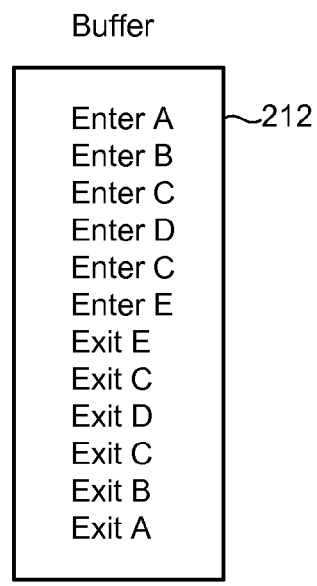
FIG. 7B shows events recorded in a buffer as a result of the exemplary call sequence of FIG. 7A.

FIG. 7A shows a second exemplary call sequence containing recursive invocations to illustrate how accurate call path information may be obtained in such cases. FIG. 7B shows the contents of the buffer 212 as a result of the call sequence. As shown in FIG. 7A, an interpreted method A calls an interpreted method B which calls an interpreted method C which calls an interpreted method D. Method D then calls method C which in turn calls interpreted method E. The buffer 212 in FIG. 7B shows the events that are generated as a result of this call sequence.

As shown in FIG. 7B, upon reaching the first exit event of method C, one does not know whether this exit event corresponds to the first or second enter events of method C (this could also be true in cases where more than two enter events are associated with method C). Thus, one cannot determine if method C or method D calls method E until it can be determined which enter event corresponds to the first exit event of method C. Method C's callees cannot be definitively determined until this information is known. In the illustrated example, once the exit event for method D is reached, the possibility that the first exit event of method C corresponds to the first enter event of method C can be ruled out. At this point, one can definitively determine the callees for method D and the inner callees for method C.

This example leads to the following observation: for a method with multiple entries on the stack, one can only determine its callees once an exit event is processed that eliminates the uncertainty regarding which of the recursive methods was exited. This can be either (1) an exit (which itself is not recursive) in between two recursive entries or (2) an exit for an earliest recursive entry (in the illustrated example, the second exit for method C eliminates the uncertainty).

Using a scheme of recyclable buffers 212 and a separate thread for buffer processing, once a buffer 212 is full, it may be queued for processing. This allows the buffers 212 to be filled up independent of processing. The buffer processing module 214 may process the buffer 212 by iterating through the buffer 212 from the beginning and building up a call stack. When an exit event is processed in the buffer 212, it may be appropriate (depending on the cases described above) to add a call edge, or increment a frequency in the call graph. Exit events may also cause us to remove a frame from our current call stack. In certain embodiments, the call graph may only be modified upon reaching exit events. The call graph may be the final output of the buffer processing module 214. The call graph consists of correct call edges and call frequency information with order of magnitude correctness.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method comprising:
   instrumenting Java bytecode, configured to execute in a mixed-mode environment where interpreted methods and non-interpreted methods can call one another, to perform the following:
   automatically record an enter event in a buffer in response to an interpreted method calling an interpreted method;
   automatically record an enter event in the buffer in response to an interpreted method calling a non-interpreted method;
   automatically record an enter event in the buffer in response to a non-interpreted method calling an interpreted method; and
   refrain from recording an enter event in the buffer when a non-interpreted method calls a non-interpreted method;
   analyzing the events in the buffer to determine call path information associated with the Java bytecode; and
   providing the call path information in the form of a call graph that documents call edges and call frequency of the Java bytecode with a specified order of magnitude correctness.

2. The method of claim 1, further comprising instrumenting the Java bytecode to:
   automatically record an exit event in the buffer in response to an interpreted method returning execution to an interpreted method; and
   automatically record an exit event in the buffer in response to a non-interpreted method returning execution to an interpreted method.

3. The method of claim 2, further comprising instrumenting the Java bytecode to:
   refrain from recording an event in the buffer when an interpreted method returns execution to a non-interpreted method; and
   refrain from recording an event in the buffer when a non-interpreted method returns execution to a non-interpreted method.

4. The method of claim 2, further comprising processing enter events and exit events in the buffer to determine caller-callee pairs, wherein the caller-callee pairs are only determined upon processing exit events.

5. The method of claim 4, further comprising, in the event the buffer contains multiple enter events and multiple exit events for a particular method, determining the particular method's callees only upon processing an exit event that eliminates uncertainty regarding which exit events of the particular method correspond to which enter events of the particular method.

6. The method of claim 4, further comprising modifying the call graph only upon processing exit events in the buffer.

7. The method of claim 1, further comprising instrumenting the Java bytecode to:
- record an event in the buffer in response to an interpreted method being popped from a stack as a result of an exception being thrown by an interpreted method; and
- record an event in the buffer in response to an interpreted method being popped from the stack as a result of an exception being thrown by a non-interpreted method.

8. The method of claim 7, further comprising instrumenting the Java bytecode to:
- refrain from recording an event in the buffer when a non-interpreted method is popped from the stack as a result of an exception being thrown by an interpreted method; and
- refrain from recording an event in the buffer when a non-interpreted method is popped from the stack as a result of an exception being thrown by a non-interpreted method.

* * * * *